UNITED STATES PATENT OFFICE.

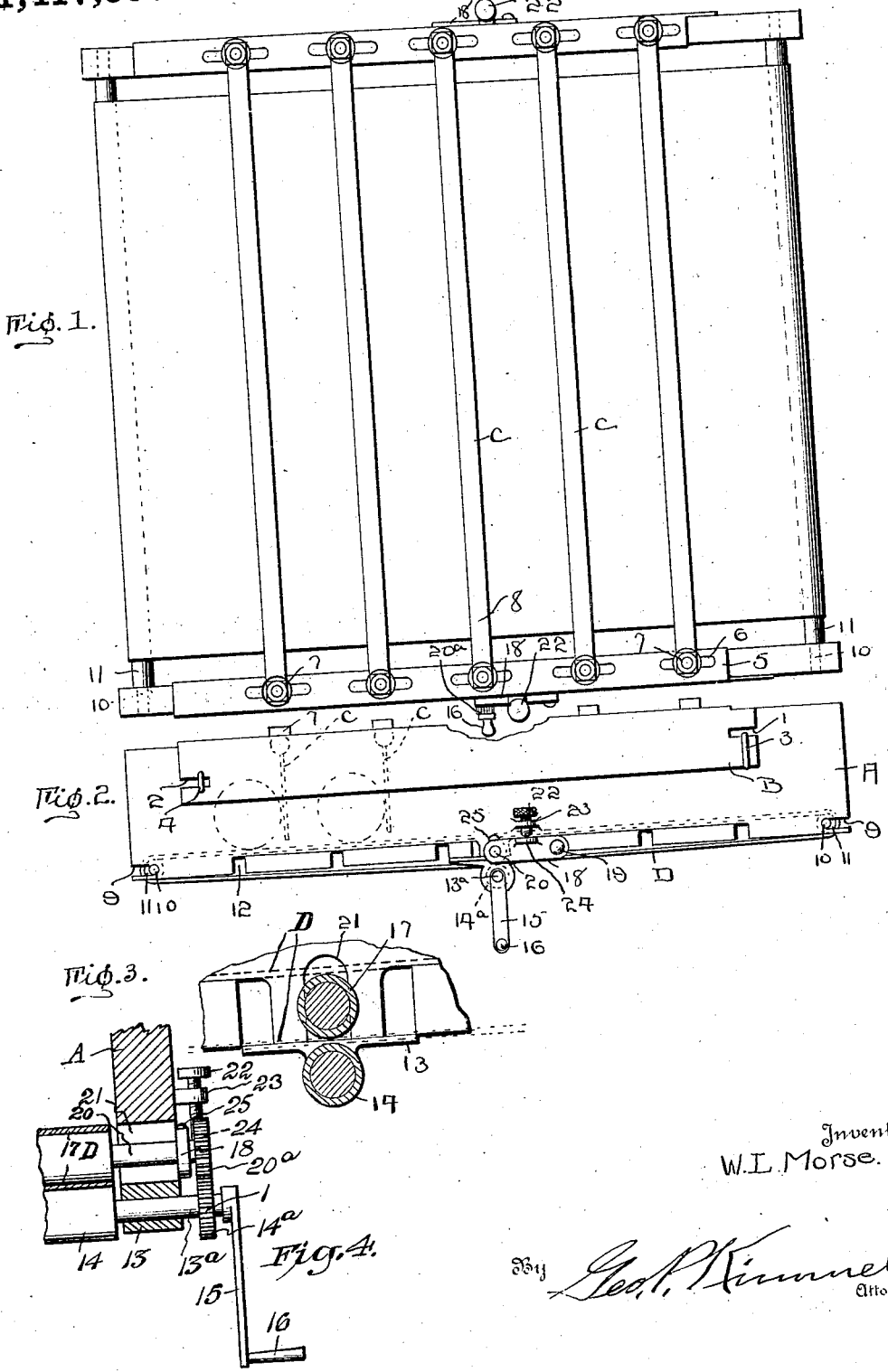

WILLISTON L. MORSE, OF PAWNEE CITY, NEBRASKA.

INCUBATOR EGG TRAY.

1,417,550.

Specification of Letters Patent. Patented May 30, 1922.

Application filed February 20, 1920. Serial No. 360,025.

*To all whom it may concern:*

Be it known that I, WILLISTON L. MORSE, a citizen of the United States, residing at Pawnee City, in the county of Pawnee and State of Nebraska, have invented certain new and useful Improvements in an Incubator Egg Tray, of which the following is a specification.

This invention relates to improvements in means for turning eggs in incubators and is particularly designed for use with the incubator described in my prior Patent Number 1,291,081 of January 14, 1919, on incubators.

The principal object of the invention is to provide in conjunction with an incubator having egg holding compartments, a bottom therefor comprising an endless belt upon which the eggs are supported, including an adjustable roller mechanism for said belt so that upon moving the belt the eggs will be turned to insure proper subjection of all portions of the eggs to the necessary heat.

Furthermore, the invention is designed to effect turning of the eggs without handling the same or opening the incubator.

For the purpose of illustrating this invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawings:—

Figure 1 is a top plan view of the device.

Figure 2 is a side elevation of the same showing in dotted lines the compartments and the eggs therein.

Figure 3 is a detail of the rollers used in moving the endless belt.

Figure 4 is a fragmentary detail view showing the relations between the gears of the intermediate and guide rollers.

Referring to the drawings wherein similar characters of reference indicate like or similar parts throughout the several views, in which:—

A designates the side portions of an incubator tray frame upon which are mounted brackets B, the ends of which are slotted as at 1 and 2, to receive respectively a U-shaped hanger 3 and a key 4 for releasably holding the same in place. The upper edges of the brackets B are flanged as at 5 and have aligned elongated slots 6 formed therein for adjustably receiving bolts 7 for securing cross rods 8 thereto which extend transversely of the tray. Carried by the cross rods are partitioning members C shown in dotted lines in Figure 2 which divide the tray into egg receiving compartments. As all of the apparatus described above forms a part of my Patent Number 1291,081 it is here shown and described merely for the sake of illustration.

The ends of the side portions A are slotted as at 9 adjacent the bottom edges and have received therein the ends of shafts 10 carrying rollers 11 about which is trained an endless belt D constituting a bottom for the tray and upon which the eggs (shown in dotted lines in Figure 2) rest. The bottom edges of the side portions A are also slotted or recessed as at 12 for ventilating the interior of the tray.

Carried on the lower edges of the side members A and opposite to each other are a pair of bearings or hangers 13 within which are journaled the pintles 13ª of a roller 14; to one of the pintles of which is keyed a gear 14ª and a crank 15 having a suitable handle 16. The endless belt D rests upon the roller 14 and a second roller 17 is mounted above the roller 14 and engages the portion of the belt D resting thereupon. Brackets 18 are pivoted to the frame as at 19 and receive the pintles 20 of the roller 17, one of which has keyed thereto a gear 20ª meshing with the gear 14ª on the roller 14, and as the pintles 20 extend through slots 21 in the side portions A upon movement of the brackets the roller 17 will be raised from engagement with the belt D and the gears 14ª and 20ª disengaged. Adjusting nuts 22 mounted in lips 23 on the side portions A engage in screw threaded openings in other lips 24 on the brackets 18 whereby to raise or lower the same to positively adjust the pressure exerted by the roller 17 upon the portion of the endless belt resting on the roller 14. Furthermore, other set nuts 25 are carried in the brackets to prevent too loose an engagement of the pintles 20 therein.

In operation, the eggs are disposed in the compartments in the manner illustrated in dotted lines in Figure 2 and when it is desired to turn the same the crank is rotated to actuate the rollers 14 and 17 through the medium of the gears 14ª and 20ª whereby to move the endless belt D which is gripped therebetween. As the eggs rest upon the belt they will be turned as the belt moves and obviously such turning of the eggs is effected without touching the same with the hands or necessitating access to the interior of the incubator.

Furthermore, the construction of the device is exceedingly simple and efficient and when the eggs are hatched the partitions may be removed and the chicks permitted to move about the incubator, the soft flooring of which (as provided by the belt) will be particularly agreeable and good for them until they become strong enough to be moved.

From the foregoing description taken in connection with the accompanying drawing, it is thought that a clear and comprehensive understanding of the construction, operation, and advantages of the invention may be had, but while I have shown and described the device as embodying a specific structure, I desire it to be understood that such changes may be made in said structure, as do not depart from the spirit and scope of the invention as claimed.

I claim:

1. In an incubator tray having side walls provided with slots, rollers supported in the slots, an endless belt trained over the rollers and constituting a bottom for the incubator, an intermediate roller for the belt supported on the sides of the incubator, an adjustable guide roller over the intermediate roller adapted for engagement with the belt, and means for actuating the intermediate roller whereby to move the belt and turn the eggs resting thereupon.

2. In an incubator tray having compartments and side walls provided with slots, rollers supported in the slots, an endless belt trained over the rollers and constituting a bottom for the incubator, an intermediate roller for the belt supported on the sides of the incubator and beneath the belt, pivoted brackets on the sides above the intermediate roller, a guide roller carried by said brackets, and means for actuating the intermediate roller whereby to move the belt and turn the eggs resting thereupon.

3. In an incubator tray having side walls provided with slots and carrying removable partitioning members forming compartments, rollers supported in the slots, an endless belt trained over the rollers and constituting a bottom for the incubator, an intermediate roller for the belt supported on the sides of the incubator and beneath the belt, brackets pivoted to the sides above the intermediate roller, a guide roller carried by the brackets and bearing upon the portion of the belt engaged by the intermediate roller, means for adjusting the brackets for regulating the pressure of the guide roller upon the belt, means for actuating the intermediate roller to move the belt to turn the eggs resting thereupon, and said partitioning members dividing the tray into compartments whereby to prevent contact and bunching of the eggs upon actuating the endless belt to turn the same.

In testimony whereof, I affix my signature hereto.

WILLISTON L. MORSE.